May 16, 1950      F. R. CHESTER      2,507,557
DISPENSER

Filed Sept. 11, 1946      2 Sheets-Sheet 1

INVENTOR.
Frank R. Chester

May 16, 1950     F. R. CHESTER     2,507,557
DISPENSER

Filed Sept. 11, 1946     2 Sheets-Sheet 2

INVENTOR.
Frank R. Chester

Patented May 16, 1950

2,507,557

UNITED STATES PATENT OFFICE 2,507,557

DISPENSER

Frank R. Chester, Santa Monica, Calif.

Application September 11, 1946, Serial No. 696,161

8 Claims. (Cl. 222—455)

This invention deals with packaged flowable goods and particularly concerns the mode of delivering portions of the goods from the package.

Most dispensing containers go no further in their aims and effects than to somewhat restrict the exit flow of the contents, wherefore at best to merely prevent egress of a larger quantity thereof at one operation of the package than was intended. They make no attempt to predetermine, control or meter the amount of their contents that can be dispensed at one time.

A few propose to meter their contents, but they do not automatically predetermine the quantity to be dispensed nor always feed out the same fixed amount. Instead, their use requires a certain degree of skill in estimating the quantity to be metered and in manipulating the container, so that they cannot be accurately classed as metering dispensers, within the present meaning of the phrase.

Moreover, their construction is ordinarily of such complexity and the material of which they are composed is so hygroscopic as to cause them rapidly to foul up in their critical regions with portions of the contents. Subsequent dispensings are hence not accurately metered and the dispensing passageways eventually become so clogged as to entirely prevent egress of any portion of the contents.

Especially is this the case with metering devices which include moving parts, such as check-valves or other unidirectional flow controlling means, and most metering dispensers comprise such components. Further, such moving parts undergo friction and abrasion, wherefore their service life is of a definitely limited duration.

Most dispensing packages expose the entire contents of the container to the detrimental effects of the air throughout the dispensing and hence are quite unsuitable for such products as contain essential oils or other volatiles such as coffee, spices, perfumes and the like.

The metering components of such dispensers are usually integral parts of the container wall and hence cannot be transferred from an emptied container to a full one with which it is desired to employ a metering device.

The conventional metering device increases the cost of the container to the manufacturer and distributor of the contained goods without incorporating sufficient advantages to him or to the user to warrant the increased cost.

The subject invention definitely eliminates each one of the aforedescribed disadantages and provides a dispensing container which automatically dispenses a predetermined invariable amount of its contents upon each complete manipulation thereof. The manipulation of the container necessitates no skill and the user is not required to make any estimate either as to the time of flow of the contents or as to the proper working of the metering device. Thus, no guesswork is required and only the desired amount of container contents is measured and rendered available at each dispensing.

The construction of the metering device, in at least one species, is of maximum simplicity being easily disassembled and its surfaces having contours "streamlined" in the direction of flow of the outgoing contents, whereby to minimize fouling and to greatly facilitate cleaning.

The invention further contemplates that a material may be employed for the metering device which is non-hygroscopic, such as an austenitic steel of pyroxylin, wherefore to eliminate adhesion of any particle of the contents thereto, thereby reducing further the possibility of fouling.

The metering device incorporates no moving parts, its construction comprising only a few fixed surfaces and a number of valveless ports. Thereby not only is fouling still further minimized, but since there is nothing that can seize, bind, jam or otherwise become inoperative and no component is subject to its own moving or other friction, the device is endowed with an indefinitely long service life. In addition the metering device can be easily disassembled for cleaning purposes, a feature necessary for commodities such as coffee, sugar, etc.

The device can be employed with containers of pulverulent solids of any description and with liquids. The essential metering components can be constructed in a number of forms all embodying the same general principle and can be mounted in or on the container in numerous modes, varying to suit the nature of the container contents.

For employment with volatile or aromatic goods the metering container can be constructed in a substantially air tight manner so as to prevent the escape of essential oils and protect the contents from exposure to the oxidizing and other deteriorational effects of the air even during dispensing.

The metering device can be constructed separately from the container and provided with integral lid or closure means, enabling it to be transferred from one receptacle to another. The device can thus be applied to such conventional containers as ordinary Mason jars and the like, transforming them into advanced dispensing and measuring receptacles.

Withal, in at least one constructional form of the invention, the fabrication thereof with a container effects no increase in the cost of the container that is not more than counterbalanced by the numerous advantages flowing from its presence.

With these and other results in view, the metering dispenser essentially comprises, in all embodiments thereof, as a new article of manufacture for containers, a metering-dispenser, including a substantially hollow body adapted to be fixedly mounted in the open end of the container; means disposed in said body in juxtaposition to the existing flow path of the container contents and adapted to effect segregation from the contents of a predetermined portion thereof upon downward rotation of the dispenser-end of the container; and means disposed in said body onwardly in said path and communicating with the first-said means for entrapping said portion therein upon rotation of the container about that axis and in that direction, both referred to the segregated position of said contents-portion, which are adequate to gravitationally urge said portion onwardly from said position, the second-said means having means operatively associated therewith for establishing communication between the contents of the second-said means and the exterior of the container upon rotation of the container about the same axis but in the opposite direction to that aforesaid.

The aforedescribed embodiments are merely illustrative, the inventive concepts being limited, in the embodiments which they can assume, only by the scope of the sub-joined claims. For purposes of illustration only, these embodiments are illustrated in the accompanying drawings and described hereinafter in conjunction therewith.

Figure 1:
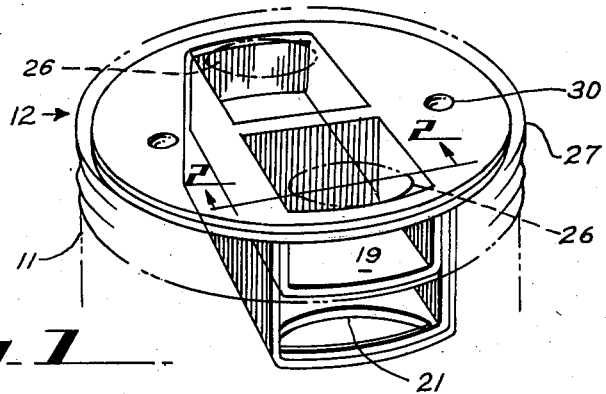
Figure 1 is a perspective of that species of the invention which constitutes the presently preferred embodiment thereof, and illustrates the metering dispenser mounted in a phantom-depicted container lacking its packed lid and the dispenser closure.
Figures 2, 3:
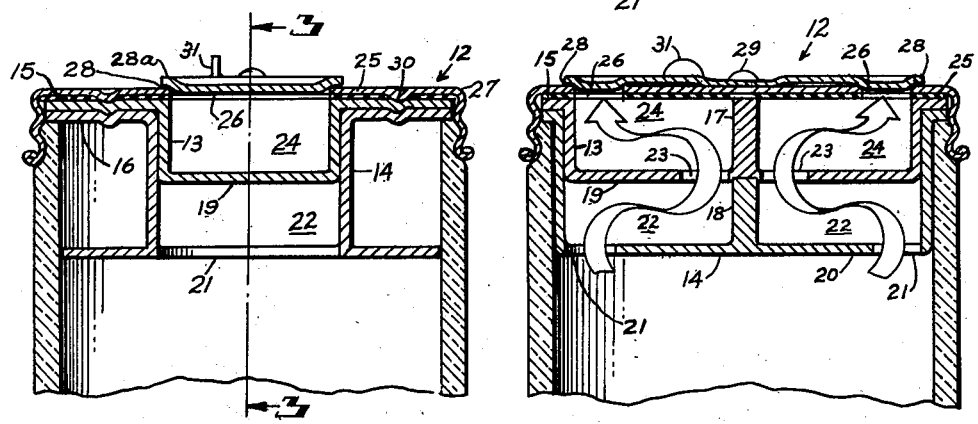
Figure 2 is a section extending transversely of the metering device and longitudinally of the container, being taken along a longitudinal plane terminating in line 2—2 of Figure 1, and including the packed cover and dispensing closure.
Figure 3 is a substantially diametral, longitudinally extending section taken substantially at right angles to the section plane of Figure 2 and along line 3—3 thereof.
Figures 4, 5:
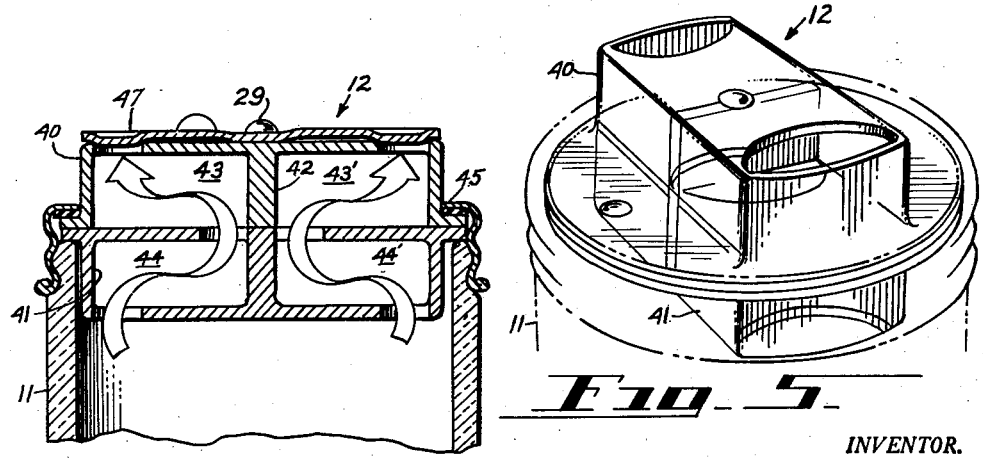
Figure 4 is a view similar to that of Figure 3, ilustrating another mode of mounting the improved metering dispenser on its support and with respect to the container.
Figure 5 is a view analogous to that of Figure 1 and depicting the external appearance of the species detailed in Figure 4, minus the container lid and the dispenser closure.
Figure 7:
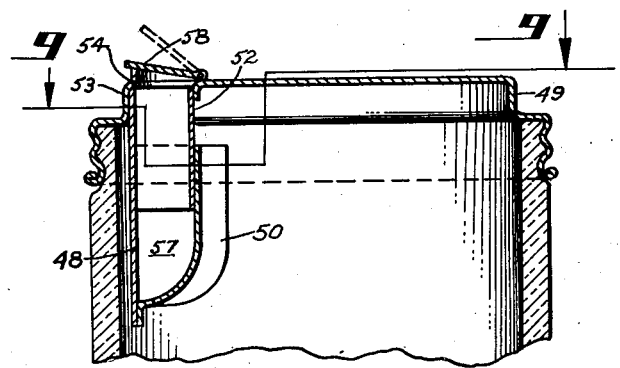
Figure 7 is a diametral section, taken on a longitudinally extending plane, of a container incorporating another species of the invention.
Figure 9:
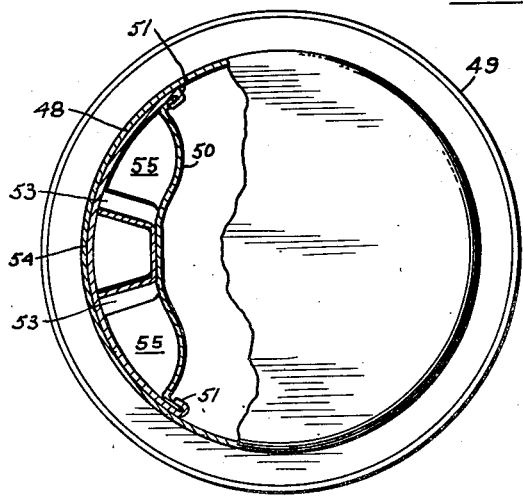
Figure 9 is a fragmental substantially transverse section on the irregular line 9—9 of Figure 8.
Figure 8:
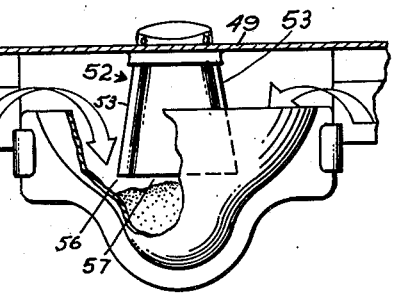
Figure 8 is a fragmentary elevation of that portion of Figure 7 which embodies the essential components of the invention.

The construction illustrated in Figures 1-6 essentially comprises an open ended container 11, in the end of which the presently-preferred form of metering dispenser 12 is shown as mounted, first, in the "low," or sunken position, as in Figures 1-3, and secondly, in the "mid," or semi-protruding, position, as in Figures 4 and 5. Obviously, by proceeding further inwardly of the container with the location of the dispenser-supporting flange shown and locating this flange to circumscribe the longitudinally or diametrally extending inner face of the parallelepipedal body of the dispenser, the dispenser may also, if desired, be so mounted as to position its body entirely outside the interior of the container. These respective mounting modes respectively enable, in the first form, stacking the containers atop each other at the slight sacrifice of interior volume; secondly, augmentation of the interior volume left available in the container but with loss of stacking ability, and thirdly, still greater availability of interior volume.

The metering device of the first species, illustrated in Figures 1-6, is particularly well suited for employment with aromatic or volatile substances, such as coffee or the like, and to this end essentially comprises an annularly flanged hollow body, divided by apertured transverse and longitudinal septa into four compartments. More specifically, referring to Figures 1-3, the body is constructed of two annularly flanged hollow open-faced parallelepipeds of different sizes, the smaller 13 being nested within the larger 14 so that it is readily removable for cleaning purposes.

The annular flange 15 at the upper periphery of the smaller parallelepiped extends radially farther than the corresponding flange 16 of the larger parallelepiped, and the transverse septum 17 of the smaller shell is aligned longitudinally of the container with the transverse septum 18 of the larger shell. The longitudinally extending septum 19 of the metering device is constituted, in this embodiment, by the lower wall of the smaller shell.

The lower wall 20 of the larger shell constitutes the initially active portion of the metering device, and to this end, contains apertures 21 disposed at the lateral ends of the body through which the container contents can enter compartments 22 defined in the metering device by the bottoms of the small and larger shells, and the septum and curved end-walls of the large shell. The apertures 21 are preferably semi-elliptical in contour, both in order to facilitate flow and for the sake of appearance.

In the medial region of the lower wall of the small shell, on opposite sides of the transverse septum are found similar apertures 23, adapted to guide the contents of compartments 22 into compartments 24 defined by this wall, the septum and the curved ends of the metering device.

A circular sheet of packing 25 bears semi-elliptical apertures 26 disposed over the lateral extremities of the compartments 24. The packing sheet is held air-tightly to the metering device, and the latter is held similarly tightly, by means of its annular flanges, diametrally across the end of the container, by means of a screw-top 27 having apertures 28 therein that register with apertures 26.

A bi-armed closure 28 is pivoted as at 29 to the outer face of the screw-top of lid. Each extremity of this closure is depressed as at 30 to snap into the corresponding aperture 28ª to seal the container. A finger grasped lug 31 is provided on the closure to facilitate rotating same.

The invention contemplates that the metering device be constructed of some non-hygroscopic material and finds austenitic steels and pyroxylin suitable for this purpose. These materials do not absorb moisture and hence eliminate caking of the container contents in the metering device. There is thus little likelihood of same becoming fouled or inoperative.

In use, the container bearing the metering device immobilized at one end is, first, tilted about its transverse axis with the dispenser-end downward. Gravity urges the container contents towards the low side thereof, some entering the then lower one of the inward, or apportioning and segregating, compartments 22 until same is partially filled. The upper one of the compartments 22 of course receives no material at this time.

Thereupon, the container is rotated about its longitudinal axis to, concurrently, gravitationally urge the contents of the first-mentioned one of compartments 22 centerwardly and through the aperture 23 into the onwardly adjacent one of the compartments 24, and to segregate some container contents in the second-said compartment 22.

Rotation of the container in the opposite sense about its longitudinal axis is then effected, and the contents of the said compartment 24 are urged out of compartment 24 and out of the container through apertures 26 and 28, provided the bi-armed closure is in open position. At the same time, the contents of the second-said compartment 22 are gravitationally urged into the outwardly adjacent one of compartments 24, thus "cocking," or conditioning the metering device for the next dispensing.

The "mid-mounted" form depicted in Figures 4–5 differs somewhat from the form of Figures 1–3 in construction as well as in mode of mounting. Instead of the nested shells of Figures 1–3 comprising the body, same is constructed of a closed-face parallelepiped 40 annularly flanged at its outer periphery and mounted in the open end of the container to diametrally occupy a longitudinal portion thereof, on which shell 40 is superimposed an inverted open-faced parallelepiped 41, annularly flanged around its inward periphery. A transverse septum 42 is cooperable with the upper wall of shell 40 and the rounded ends of the shell define four apertured compartments 43, 43' and 44, 44' constructed as, and for the purposes, expounded in connection with the preceding form. The sealing member 45 here assumes the form of a ring or gasket instead of a circular sheet, but substantially the same type of screw-top 46 and bi-armed closure 47 are employed.

The manipulation and functioning of this form are the same as with the afore-described embodiment, in essence consisting of a diagonally downward tilting of the dispenser-end of the container, succeeded by rotating the container about its longitudinal axis to effect a metered dispensing through one of the discharge apertures while concurrently conditioning the device for the succeeding dispensation.

The species illustrated in Figures 7–10 essentially comprises an arcuate sheet 48 of non-hygroscopic material, such as stainless steel or pyroxylin disposed longitudinally of the container and adapted to be immobilized in juxtaposition with the open end thereof by means of a screw-top or lid 49 with which it is unitary. A substantially reversely-formed sheet 50 of the same material, longitudinally shorter than the first-said sheet, is confrontingly mounted on the inner face of the first-said sheet, as by means of clamp-ears 51 in such manner as to define a hollow shell having an arcuate pocket or cup-like pouch on the inner face of the article which is readily removable for cleaning purposes. A spout or conduit 52 extends longitudinally between said sheets in contiguity therewith and is united along one of its outer longitudinal faces 53 to the first-said sheet, being attached along its opposite face 54 to the second-said sheet, which is suitably concaved into contact with it for this purpose.

The two sheets and the spout together define three compartments within the confines of the metering device. Two of them, 55, are identical and one of these is disposed laterally of each free unattached side of the spout. Each of the compartments 55 consists of a portion of the adjacent free side of the spout, a portion of the lid, a portion of the sheet 50 and a portion of the sheet 48, thus constituting a six-sided hollow geometrical solid with portions of two faces missing. The bottom of each compartment 55 opens downwardly at 56 into the upper lateral regions of a central compartment 57 defined between the sheets 48 and 50 and the lower end of the spout and the broad face and the lateral face of each compartment 55 opens into the interior of the container. The laterally flared lower end of the spout overlies and subtends the entire cross-sectional area of compartment 57.

A closure 58 may be hinged to the outer end of the spout.

Figure 10:
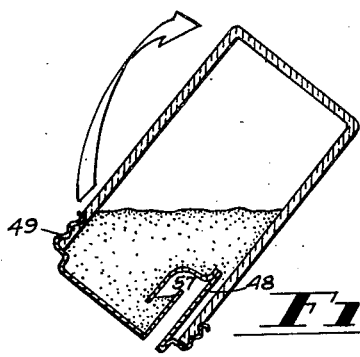
Figure 10 is a longitudinal diametrally extending section of a container including the invention, ilustrating same inclined into the position it occupies during metering use.
Figure 6:
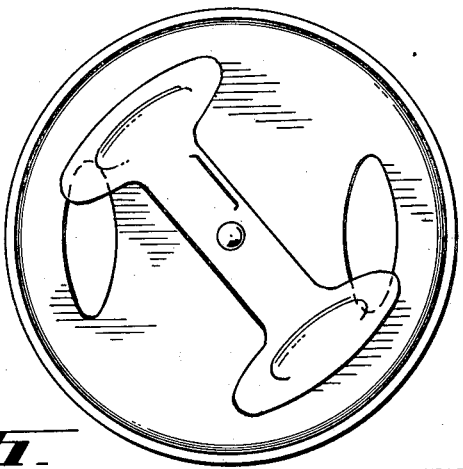
Figure 6 is a top plan view of the article disclosed in Figures 2 and 3, presented for the purpose of clarifying the action of the dispensing aperture closure member.

In use, the container is tilted to substantially 45° with the horizontal and a predetermined portion of the contents is apportioned or demarked in the lowered one of the compartments 55, being segregated from the remainder of the contents, as shown in Figure 10. This predetermined portion is encompassed between the lid, the shorter arcuate sheet, the longer one, and one side of the conduit. The container is then rotated about its transverse axis to an upright position, this movement urging the contents of the filled one of the compartments 55 into the central, or trapping and detaining, chamber. Upon inverting the container this metered portion is gravitationally urged out of the central chamber into the conduit, and thence out of the container.

I claim:

1. As a new article of manufacture, a metering dispenser for containers, including: a hollow body adapted to be immobilized longitudinally of the container in the open end thereof, said body including surfaces defining, with the immobilizing means, perforated contents-separating compartments disposed laterally in the upper portion of said body, said body including surfaces defining a contents-detaining compartment for said separated portions disposed between and below the first-said compartments; and discharge means extending from juxtaposition to the contents-detaining compartment, to the exterior of the container.

2. As a new article of manufacture for containers, a metering dispenser, including: an arcuate sheet of material adapted to be juxtaposed, by its one end, longitudinally adjacent to the inside of the container and carrying means at its other end for immobilizing the dispenser in the container; a substantially reversely formed, longitudinally shorter sheet of material confrontingly mounted on the first-said sheet; and a conduit extending longitudinally between said sheets in contiguity therewith and defining within the confines of said sheets and said means, a compartment lying below the inner end of the conduit and opening upwardly and laterally to each side of the conduit, the latter defining a compartment disposed laterally of each free side thereof, each such latter compartment opening upwardly into the container and downwardly into the first-said compartment.

3. As a new article of manufacture, a metering dispenser for containers, including: a hollow body adapted to be immobilized longitudinally of the container in the open end thereof; walls forming said body and defining, with the immobilizing means, perforated cup-like container contents separating compartments disposed laterally in the upper portion of said body; said walls also together defining a contents-detaining compartment for said separated contents portions disposed between and below said cup-like compartments; and discharge means extending from juxtaposition to the contents-detaining compartment to the exterior of the container, said discharge means having a laterally flared lower portion for overlying and subtending substantially the entire contents of said contents-detaining compartment.

4. A metering top-closure for containers which is adapted to protect the undispensed container-contents from contact with the atmosphere in all operative positions of the container, comprising: a hollow elongate body adapted to fit transversely of the one end of the container; a pair of walls extending respectively longitudinally and transversely of the interior of said body and intersecting to divide the latter into a pair of contiguous compartments lying diametrally adjacent the inner face of said body and a pair of contiguous compartments lying diametrally adjacent the outer face of the body, the inner and outer faces of said body having an aperture at each diametral end thereof and said longitudinally extending wall having an aperture in its central region adjacent each side of said transversely extending wall, thereby to establish outwardly directed, contents flow-paths initially diagonally directed toward the longitudinal axis of the container and subsequently diagonally directed away from said axis and coincidentally establishing similar but reverse, inward flow-paths for the atmosphere directed through said body inwardly along, and congruent with, the aforesaid paths, said contents flow-paths enabling the admission of portions of the contents of the downwardly inclined container into the first-said compartments and onto the inner face of said longitudinally extending wall and onto the inner face of said outer wall of said outer compartments, the positions of said centrally disposed apertures with respect to said diametrally separated apertures and the positions of the last said apertures with respect to the outer diametral walls of their corresponding compartments enabling the accumulation of said portions in said compartments diagonally across the inward flow-path of the atmosphere into said container; whereby said diagonally disposed accumulations effectively block the entry of the atmosphere through said body into the interior of the container, thereby to preserve the container contents from the detrimental effects of air thereon regardless of the position of the container.

5. A readily disassemblable, fastenerless-united metering and dispensing top closure for open-end containers having no surface not directly and planarly accessible for ready cleansing, comprising: an elongate, hollow parallelepipedal body open along its upper face and circumscribed by an annular flange adapted to fit diametrally of the open-end of said container with said flange resting on said open-end of the container; a vertical partition disposed medially of the length of said body and extending substantially half the height of said body, the inner, contentsward face of said body, lying opposite said open face, having an aperture at each diametral extremity thereof; a hollow parallelepipedal body similar to the first said body as to shape, length and width and closed as to its outer face as well as to its other faces but having a depth substantially half that of the first said body and including a vertical partition disposed medially of its length and circumscribed by a circular flange, the second said body being nested in the first said body with its partition aligned with the first said partition and with its flange superimposed upon the first said flange, the lower or inner face of the second said body having an aperture in its central region laterally adjacent the vertical partition therethrough and the outer face of the second said body having an aperture at each diametral extremity thereof, said apertures and walls establishing two substantially parallel outwardly directed contents metering and metered portion shunting and dispensing paths through said nested bodies; and removable means for clamping said flanges to said open end, thereby to enable removal of said nested bodies unitarily from said container and separation of the nested bodies from each other so as to expose every surface on the interior and exterior of each body; whereby to enable access to all the interior surfaces of the parallelepipedal top closure of one and the same planeal cleansing instrumentality that is employable for cleaning.

6. A metering, flow cut-off and dispensing top closure unit adapted for interchangeable use with respective open top containers, comprising: a hollow, elongate body circumscribed longitudinally by an annular flange unit having a diameter sufficient to support said body on the open top of open top containers of substantially varying diameters; contents metering compartments in said body located adjacent the interior of the container and flow connected to the container contents through the inner face of said body; metered portion cut-off compartments in said body integral with the first said compartments and located adjacent the outer end of said container and flow connected in their inner walls to said metering compartments and flow connected in their outer walls to the exterior of the container so as to effect longitudinal discharge of said metered portions outwardly of the container and substantially parallel to the longitudinal axis of the container upon downward tilting thereof followed by rotation thereof about its longitudinal axis alternately in opposite directions; whereby to enable removal from said container of all said united compartments as a unitary article and to enable insertion of said article in the open top of various diameter containers to constitute it a metering and dispensing top closure therefor.

7. A metering top closure for a container closed by its walls except at the top end thereof, comprising: a hollow parallelepipedal body adapted to diametrally occupy said top end and circumscribed by a flange adapted to be sealed to said end; a wall extending longitudinally of said body from the one end thereof to the opposite end and lying intermediate the outer and inner faces of the body, thereby to divide the interior volume thereof into inwardly and outwardly located longitudinally extending sub-volumes; another wall extending transversely of said body from the outer face to the inner face thereof and dividing said sub-volumes into two pairs of compartments, the compartments in each pair being seriately arranged longitudinally of the container and the pairs being mutually adjacent diametrally of the container; the wall of said body adjacent the container's interior having a contents admitting aperture in each extremity thereof, said intermediate wall having a contents transmitting aperture therein laterally adjacent to said transversely extending wall, and the outer wall of said body having a contents discharging aperture in each extremity thereof, whereby to establish two outwardly directed flow-paths parallel connected at their inner ends to diametrically opposite points of the interior of said container and connected at their outer ends to diametrically opposite points of the end face of said container; said paths respectively leading from the apertures at the respective extremities of the inner face of said body diagonally inwardly of the adjacent inwardly located compartment to the corresponding aperture in said intermediate wall at the respective sides of said transversely extending wall, and thence diagonally outwardly of the adjacent outwardly located compartment to the respective apertures in the extremities of the outer wall of said body, said flow-paths and said apertured walls thus constituting said inwardly located compartments contents metering chambers disposed closely adjacent to the container contents and effective in inclined positions of the container considerably short of complete vertical inversion of the container to segregate constant amounts of said contents from the container, and to constitute said outwardly located compartments metered portion receiving and dispensing compartments effective upon rotation of the container about its longitudinal axis in alternately opposite directions to direct said metered portions longitudinally outwardly of the container; whereby to enable said seriate pairs of compartments to trap the advancing container contents therein and prevent exit thereof from said container in vertically inverted positions thereof and to enable said seriate compartments in downwardly inclined positions of the container to dispense said metered portions successively from diametrically opposite ends of said body and longitudinally outwardly of the container upon rotation of the container about its longitudinal axis and alternately in opposite directions, so as to obviate the necessity for vertically inverting the container to effect metering and dispensing of its contents.

8. As a new article of manufacture for containers, a metering-dispenser, including: a substantially hollow body adapted to be fixedly mounted in the open end of the container; means disposed in said body in juxtaposition to the exiting flow path of the container contents and adapted to effect segregation from the contents of a predetermined portion thereof upon downward rotation of the dispenser-end of the container; and means disposed in said body onwardly in said path and communicating with the first-said means for entrapping said portion therein upon rotation of the container about that axis and in that direction, both referred to the segregated position of said contents-portion, which are adequate to gravitationally urge said portion onwardly from said position, the second-said means having means operatively associated therewith for establishing communication between the contents of the second-said means and the exterior of the container upon rotation of the container about the same axis but in the opposite direction to that aforesaid; said means including surfaces defining a pair of outward flow paths directed alternately towards and away from the transverse axis of said dispenser, the entrances of said paths being located at the lateral extremities of the dispenser and laterally separated from each other throughout the lengths of said paths, whereby to enable, immediately prior to dispensing, accumulation of metered portions of the container contents across the path of air attempting to enter said container through the then open dispenser, thereby to prevent exposure of the container contents to the deleterious effects of the air.

FRANK R. CHESTER.

REFERENCES CITED

The following references are of record in the file of this patent:

UNITED STATES PATENTS

| Number | Name | Date |
| --- | --- | --- |
| 701,086 | Puddefoot | May 27, 1902 |
| 830,611 | Murray | Sept. 11, 1906 |
| 1,495,683 | Gates | May 27, 1924 |
| 2,023,537 | Myers | Dec. 10, 1935 |
| 2,243,452 | Bickel | May 27, 1941 |